United States Patent
Bovero

(10) Patent No.: US 10,308,159 B2
(45) Date of Patent: Jun. 4, 2019

(54) VEHICLE CADDY

(71) Applicant: Ricardo Bovero, Tampa, FL (US)

(72) Inventor: Ricardo Bovero, Tampa, FL (US)

( * ) Notice: Subject to any disclaimer, the term of this patent is extended or adjusted under 35 U.S.C. 154(b) by 0 days.

(21) Appl. No.: 15/216,922

(22) Filed: Jul. 22, 2016

(65) Prior Publication Data
US 2017/0136934 A1    May 18, 2017

Related U.S. Application Data

(63) Continuation-in-part of application No. 14/551,691, filed on Nov. 24, 2014, now abandoned.

(51) Int. Cl.
*B60P 3/07* (2006.01)
*B60P 1/24* (2006.01)
*B62B 5/00* (2006.01)
*B62B 5/04* (2006.01)

(52) U.S. Cl.
CPC ............ *B60P 3/07* (2013.01); *B60P 1/24* (2013.01); *B62B 5/0093* (2013.01); *B60Y 2200/12* (2013.01); *B60Y 2200/122* (2013.01); *B62B 5/0433* (2013.01); *B62B 2202/90* (2013.01)

(58) Field of Classification Search
CPC ..... B60S 13/00; B62B 5/0093; B62B 5/0083; B62B 2202/90; B60P 3/06; B60P 3/122; B60P 3/07; B62H 3/00; B62H 3/08
See application file for complete search history.

(56) References Cited

U.S. PATENT DOCUMENTS

| | | | | |
|---|---|---|---|---|
| 3,881,740 A | * | 5/1975 | Johnson | B62B 5/0093 280/79.11 |
| 4,901,647 A | * | 2/1990 | Drabing | B62H 3/00 104/44 |
| 5,486,014 A | * | 1/1996 | Hough | B62B 5/0083 24/535 |
| 5,609,461 A | * | 3/1997 | Lichtenberg | B60P 3/07 280/79.11 |
| 6,102,645 A | | 8/2000 | Kooima et al. | |
| 6,287,069 B1 | * | 9/2001 | Oliphant | B62H 3/08 414/426 |
| 7,033,119 B2 | * | 4/2006 | Baker | B60P 3/122 410/30 |
| 7,278,647 B1 | * | 10/2007 | Keenan | B60S 13/00 280/79.11 |
| 8,052,159 B2 | * | 11/2011 | Chen | B62H 1/02 280/79.11 |

* cited by examiner

*Primary Examiner* — Mark C Hageman
(74) *Attorney, Agent, or Firm* — GrayRobinson, P.A.; Michael J. Colitz, III

(57) ABSTRACT

Disclosed is a caddy system for personal vehicle. As a two or three-wheeled vehicle. The term "personal vehicle" as used herein is intended as a broad classification for two and three wheeled motorcycles. It further includes three and four wheeled all-terrain (ATV) vehicles. In broad terms, the caddy includes a platform that is supported by a series of wheels. The caddy is designed to be tipped forwardly or rearwardly as needed to allow the vehicle to enter onto and exit off the platform. Once upon the caddy, a single user can easily move, maneuver, or manipulate the vehicle. This is ideal for storing and/or maintaining the vehicle.

3 Claims, 8 Drawing Sheets

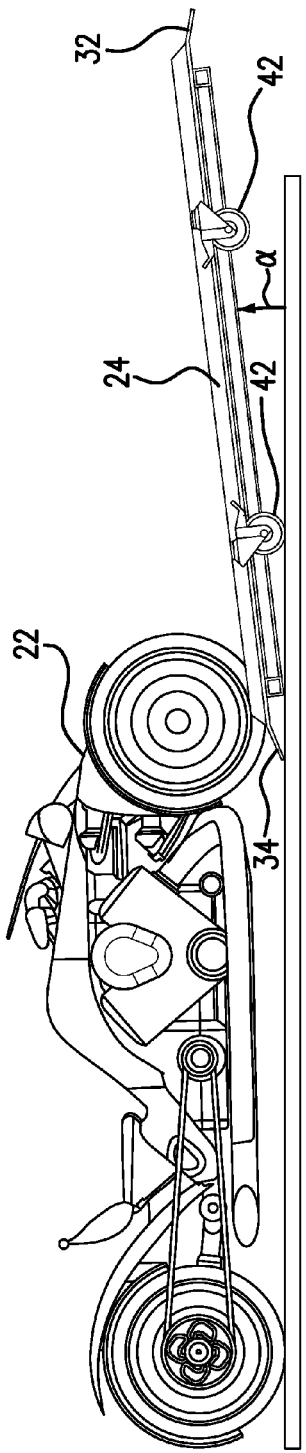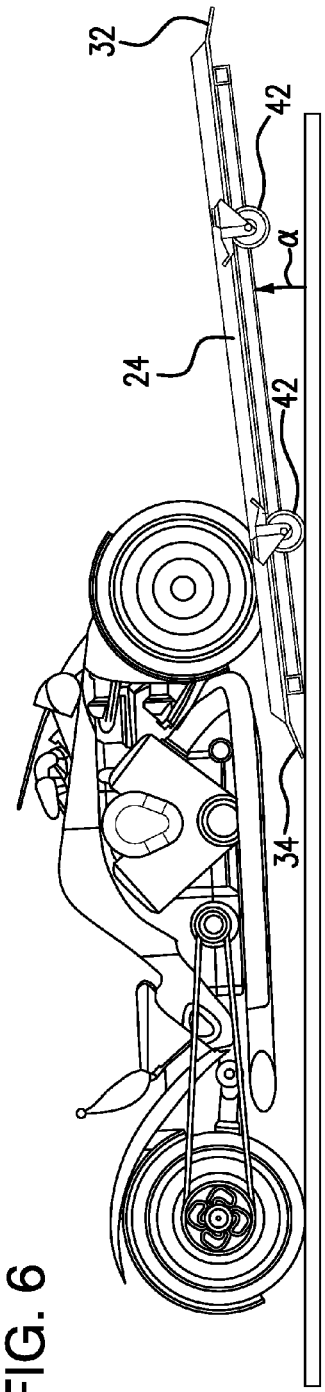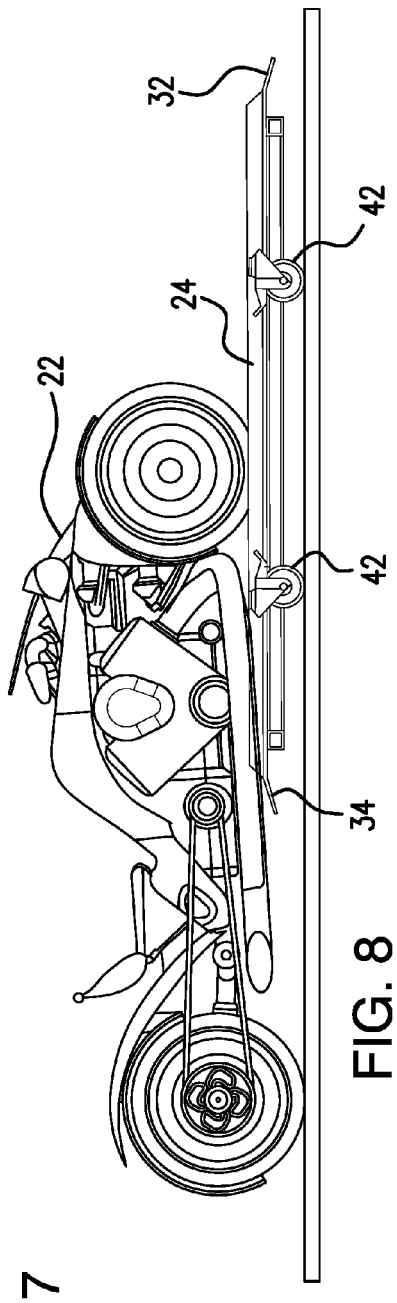

VEHICLE CADDY

CROSS REFERENCE TO RELATED APPLICATIONS

This application claims priority to and is a continuation-in-part of co-pending patent application Ser. No. 14/551,691 filed on Nov. 24, 2014 and entitled "Vehicle Caddy." The contents of this co-pending application are fully incorporated herein for all purposes.

TECHNICAL FIELD

This disclosure relates to a vehicle caddy. More particularly, the present disclosure relates to a movable platform for storing and transporting vehicles.

BACKGROUND OF THE INVENTION

The popularity of personal vehicles has dramatically increased in recent years. The term "personal vehicle" as used herein is intended as a broad classification for two and three wheeled motorcycles. It further includes three and four wheeled all-terrain (ATV) vehicles. Personal vehicles are generally much smaller than automobiles and are intended to be ridden by one or two people.

Personal vehicles often must be stored and maintained in a garage. As is often the case, personal vehicles are stored in close proximity to larger automobiles or vehicles. As a result, operators frequently have to wheel personal vehicles into the garage by hand. This can be difficult given the weight of most personal vehicles. Furthermore, when these vehicles are being worked upon, the maintenance technicians often need to access all sides of the vehicle. This requires the user to frequently change positions or to manipulate the vehicle by hand. Requiring users to maneuver these heavy vehicles by hand can pose a danger to the vehicle and/or the user.

What is needed, therefore, is a caddy that permits personal vehicles to be transported, maneuvered and manipulated by a single user. The vehicle caddy of the present disclosure is designed to fulfill these and other shortcomings present in the art.

SUMMARY OF THE INVENTION

This disclosure provides a vehicle caddy for storing, transporting, and maintaining a personal vehicle.

One advantage of the caddy is that two, three, and four wheeled vehicles can be transported, maneuvered, and manipulated by a single user.

A further advantage is realized by providing a caddy that allows personal vehicles to be easily positioned on and off of a platform associated with the caddy.

Yet another advantage is realized by providing a caddy that allows a vehicle to be easily rotated such that all sides of the vehicle can be easily accessed by a user.

Various embodiments of the invention may have none, some, or all of these advantages. Other technical advantages of the present invention will be readily apparent to one skilled in the art.

BRIEF DESCRIPTION OF THE DRAWINGS

For a more complete understanding of the present disclosure and its advantages, reference is now made to the following descriptions, taken in conjunction with the accompanying drawings, in which:

FIG. 6 is a side elevational view of a vehicle being positioned onto the vehicle caddy.

FIG. 7 is a side elevational view of a vehicle being positioned onto the vehicle caddy.

FIG. 8 is a side elevational view of a vehicle being positioned onto the vehicle caddy.

Similar reference numerals refer to similar parts throughout the several views of the drawings.

PARTS LIST

| | |
|---|---|
| 20 | Caddy |
| 22 | Vehicle |
| 24 | Platform |
| 26 | Upper Surface |
| 28 | Lower Surface |
| 32 | Forward End |
| 34 | Rearward End |
| 36 | Side Edges |
| 38 | Knurled Surface |
| 42 | Wheels |
| 44 | Axle |
| 46 | Angled Wheel Support |
| 48 | Fork |
| 52 | Lock |
| 60 | Alternative Embodiment |
| 62 | Narrowed Platform |
| 64 | Side Platform |
| 120 | Alternative Embodiment |
| 122 | Central Platform |
| 124 | Side Platforms |
| 126 | Angled Wheel Support |
| 128 | Fork |
| 132 | Lock |
| 134 | Wheels |

The present invention relates to a caddy system for personal vehicle. The term "personal vehicle" as used herein is intended as a broad classification for two and three wheeled motorcycles. It further includes three and four wheeled all-terrain (ATV) vehicles. In broad terms, the caddy includes a platform that is supported by a series of wheels. The caddy is designed to be tipped forwardly or rearwardly as needed to allow the vehicle to enter onto and exit off the platform. Once upon the caddy, a single user can easily move, maneuver, or manipulate the vehicle. This is ideal for storing and/or maintaining the vehicle. The various components of the present invention, and the manner in which they interrelate, are described in greater detail hereinafter.

Figure 1:
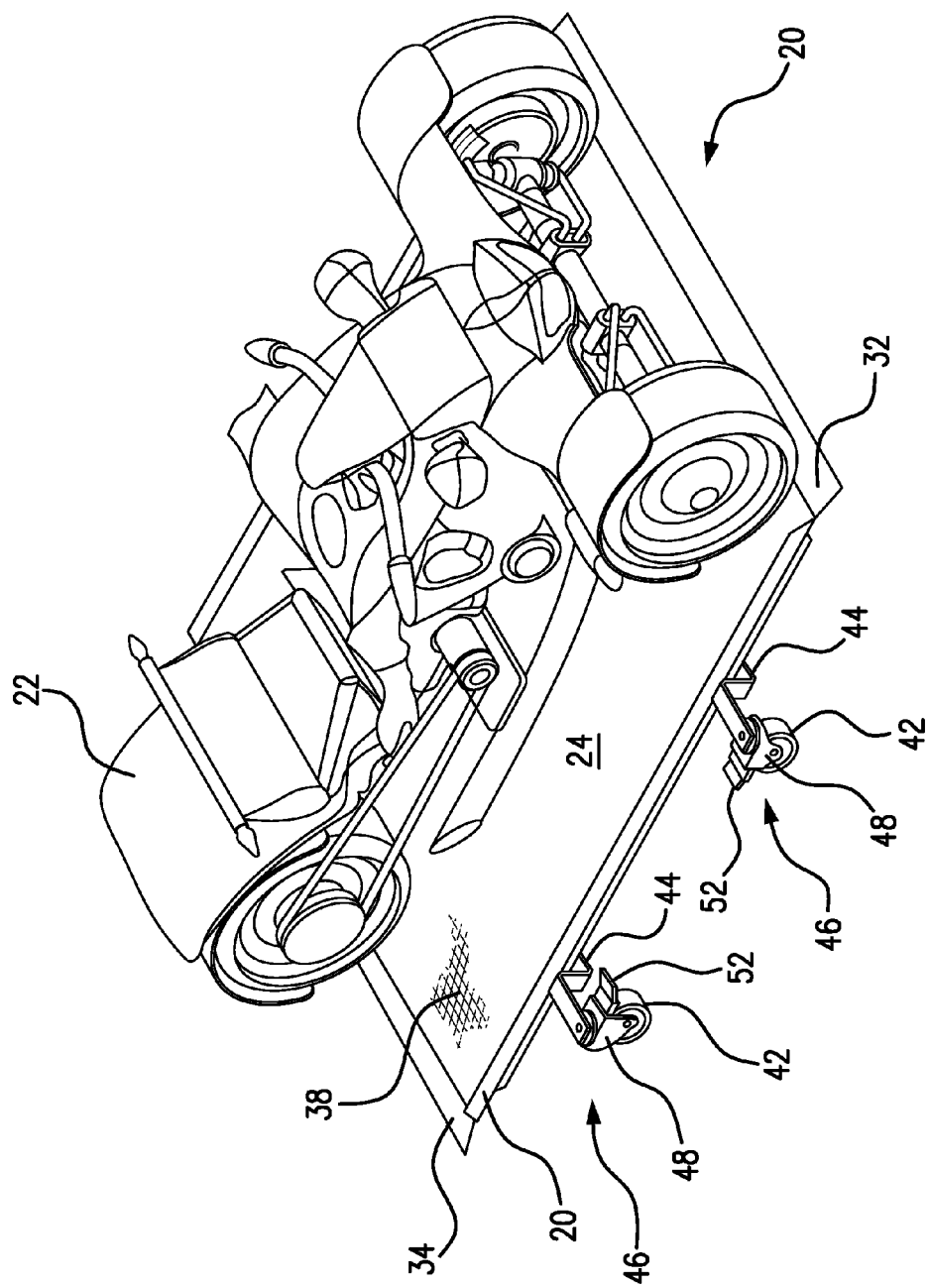
FIG. 1 is a perspective view of the vehicle and caddy of the present disclosure.
Figure 2:
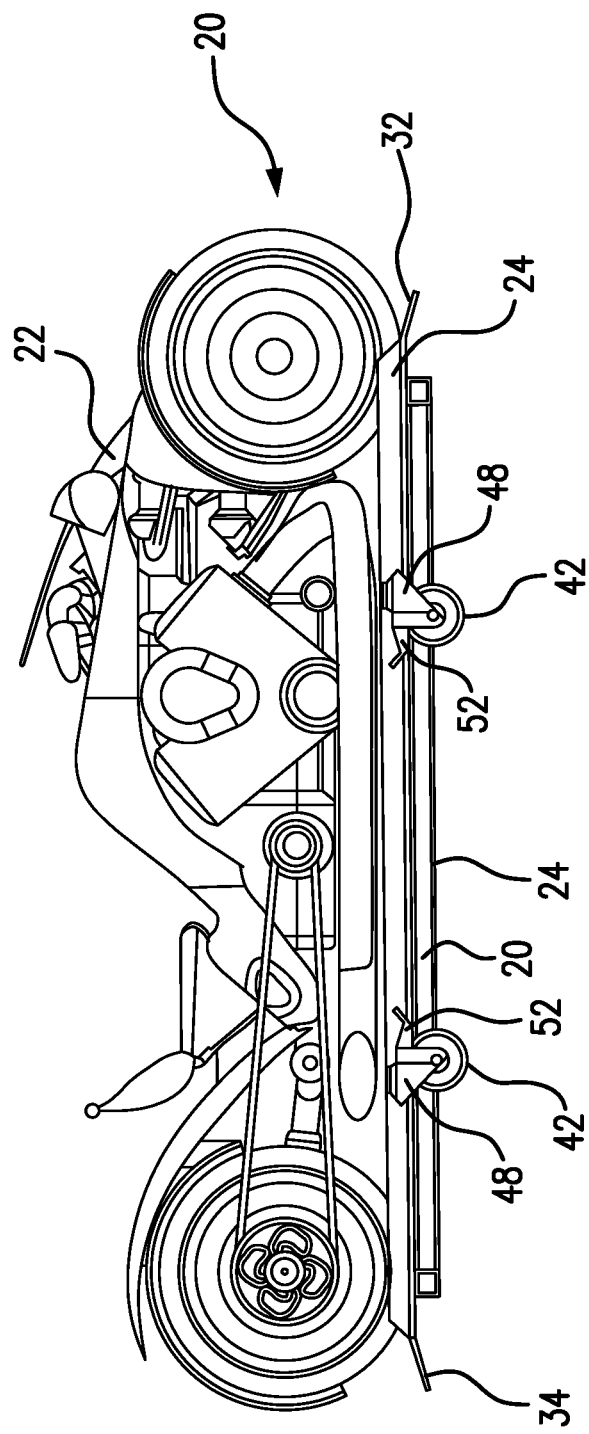
FIG. 2 is a side elevational view of the vehicle and caddy of the present disclosure.
Figure 3:
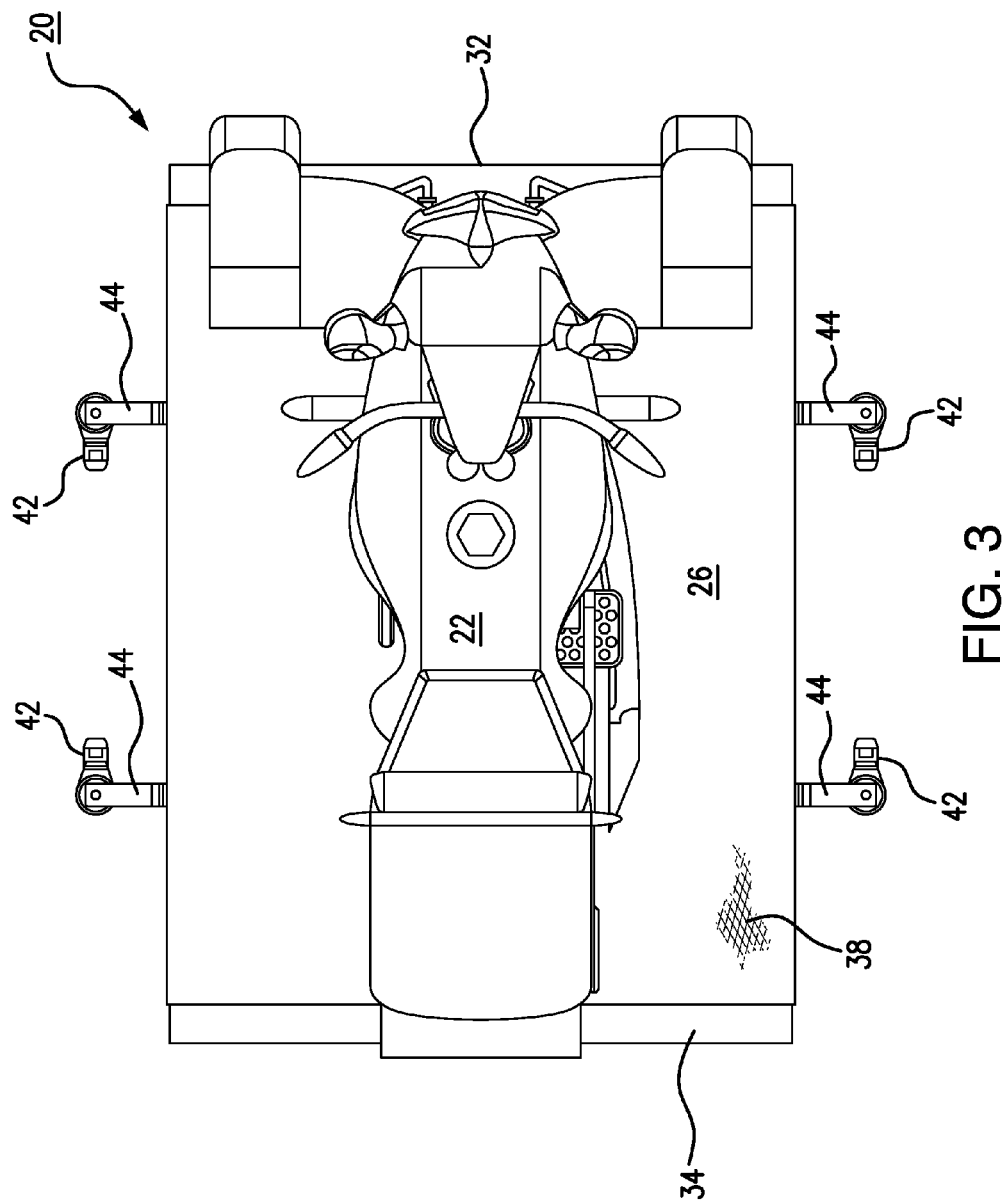
FIG. 3 is a top plan view of the vehicle and caddy of the present disclosure.
Figure 4:
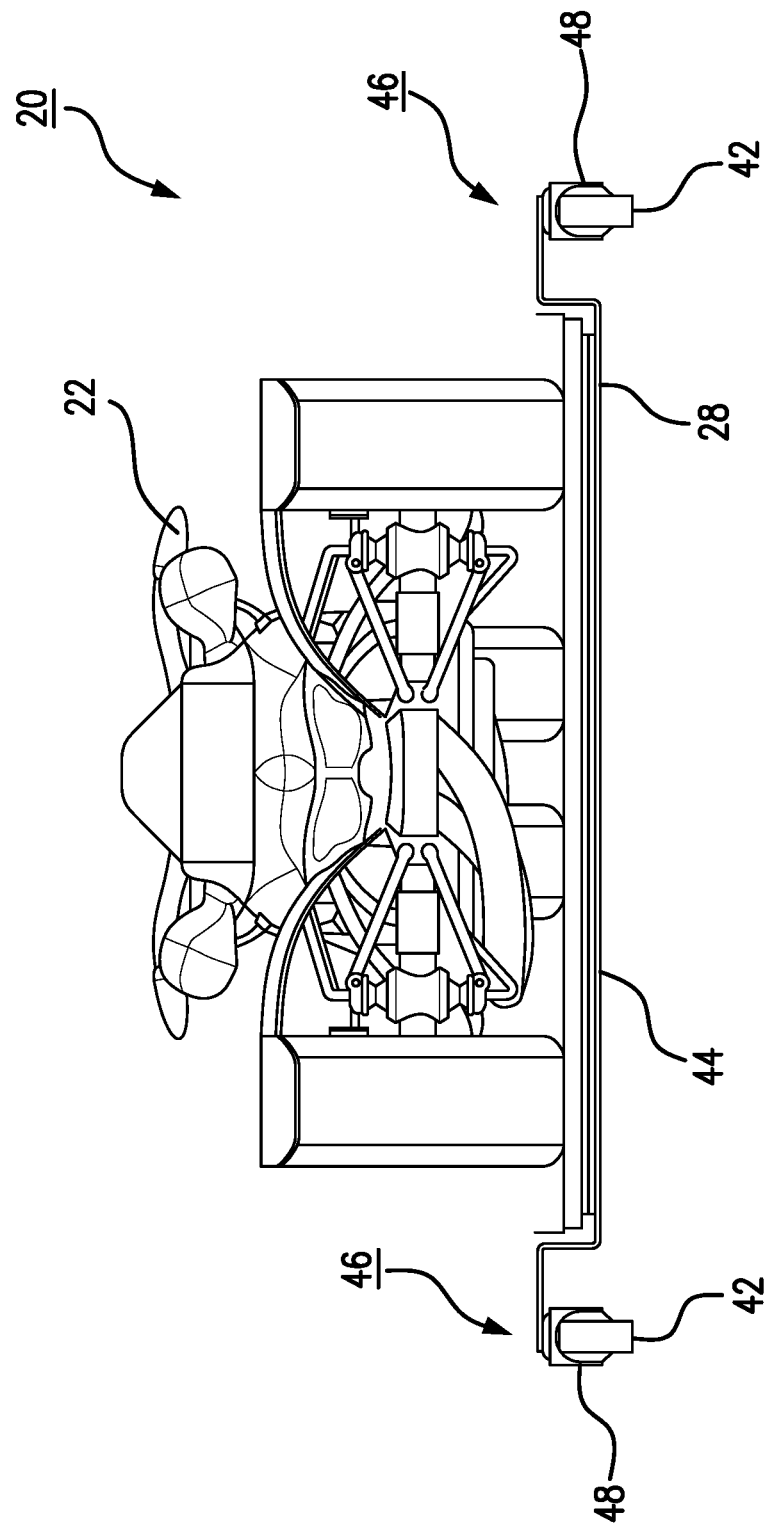
FIG. 4 is a front elevational view of the vehicle and caddy of the present disclosure.
Figure 5:
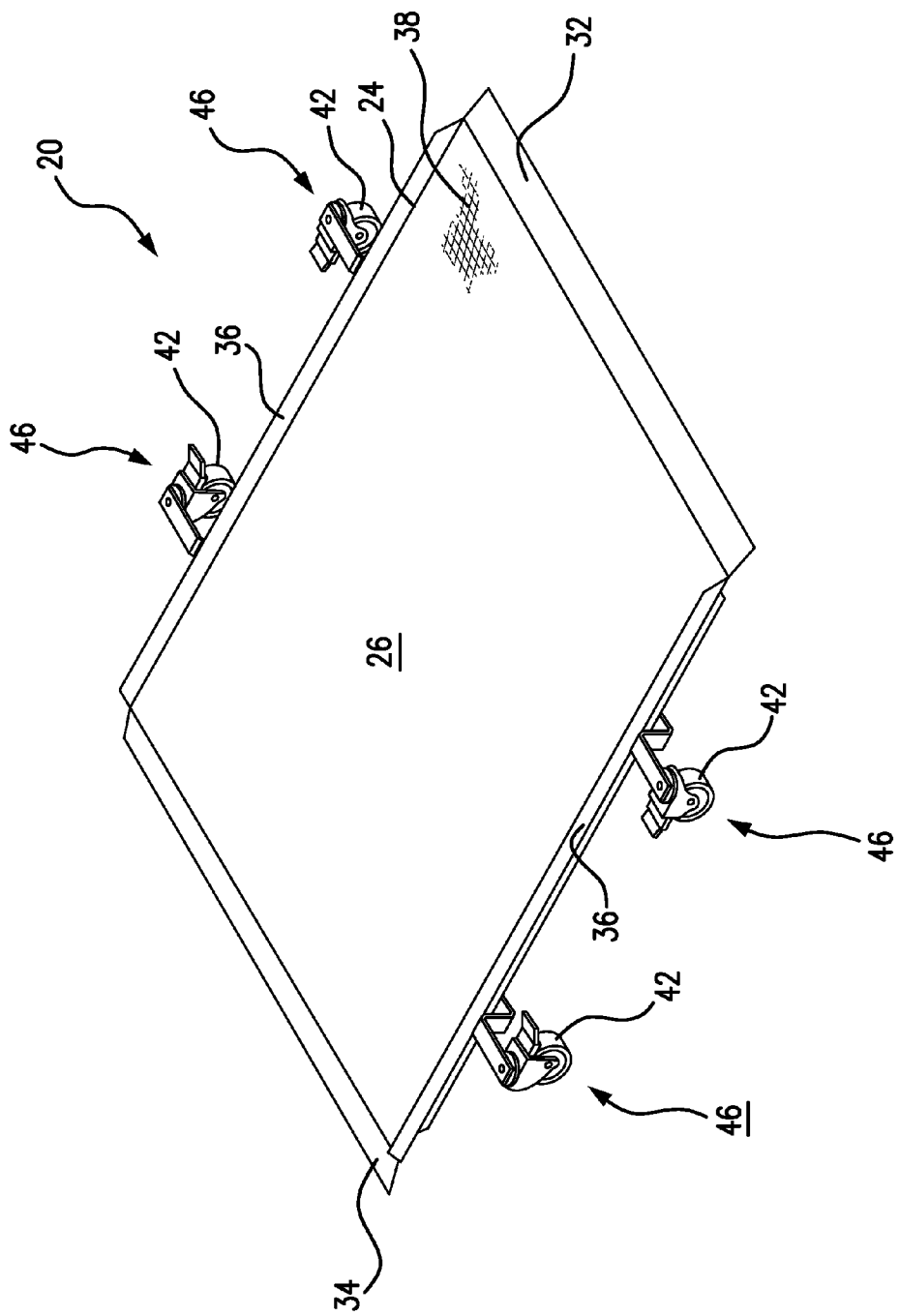
FIG. 5 is a perspective view of the vehicle caddy of the present disclosure.

FIG. 1 illustrates a perspective view of the caddy 20 and vehicle 22 of the present invention. As illustrated, the major component of the caddy is a rectangular platform 24. Although the invention has been described in conjunction with a rectangular platform 24, any other platform configurations can be employed to suit the size and shape of the vehicle. In the depicted embodiment, platform 24 is defined by upper and lower surfaces (26 and 28), and forward and rearward ends (32 and 34). It is preferred that the opposing side edges 36 of the platform 24 be turned upwardly at a 90 degree angle to prevent objects from rolling, or falling, off the platform. Additionally, the forward and rearward most edges (32 and 34) of the platform 24 are angled downwardly. This allows a smooth transition as the vehicle 22 is rolled onto or off of the platform. The manner in which the vehicle 22 is positioned on the platform 24 will be described in greater detail hereinafter. Ideally, the upper surface 26 of the platform 24 can have a knurled or textured surface 38 to promote a sufficient grip between the vehicle tires and the caddy.

As illustrated, platform 24 is supported by a series of four wheels. Each wheel 42 is rotatably supported at the end of an axle 44. Each of the axles 44 preferably extends across the entire width of the lower surface 28 of platform 24. In an important aspect of the present invention, these axles 44 are positioned inward of the forward and rearward ends (32 and 34) of platform 24. In particular, each axle 44 is positioned approximately ⅓ of the overall length of the platform 24 from each respective edge. Namely, the distance between the axles is roughly equivalent to the distance between each axle and the adjacent forward or rearward edge. This allows platform 24 to be pivoted about either axle 44 as the vehicle 22 enters is rolled onto or off of the platform.

Each axle 44 terminates in a 90 degree angled wheel support 46. In other words, each axle 44 has a upwardly turned edge that allows the distal most end of each axle 44 to be positioned above the top surface 26 of the platform. This gives clearance for the wheels 42 of the platform, but nonetheless allows the platform 24 to be positioned at only a minimal distance off the ground. Each of the wheels 42 shows a similar construction and only one will be described in detail. Namely, each wheel includes a swiveled fork 48 which is secured onto the distal end of each axle. A wheel 42 is then rotatably secured to the fork 48 in a manner similar to a swivel castor. This allows the wheels 42 to have a free range of motion and allows them to freely support the platform 24. A wheel lock 52 can also be associated with the swivel to lock it at a particular angle or orientation.

With reference now to FIGS. 6, 7, and 8, a sequence of mounting the vehicle onto the platform can be seen. In the first figure, the forward most wheels of the vehicle are positioned on the rearward end of the platform. This causes the platform to pivot about the rearward most axle to form an angle alpha α. Namely the front end of the platform and the forward axle is raised above the ground. At this point, the angled rearward edge of the platform engages the ground permitting the vehicle to be driven or pushed onto the platform. As the vehicle is extended onto the platform, the platform is pivoted downwardly such that all the wheels engage the ground. In this orientation the vehicle can be maneuvered for storage and/or maintenance by a single user. Once the user is done, the vehicle can be driven off or positioned off the forward edge of the platform in a similar fashion.

Figure 9:
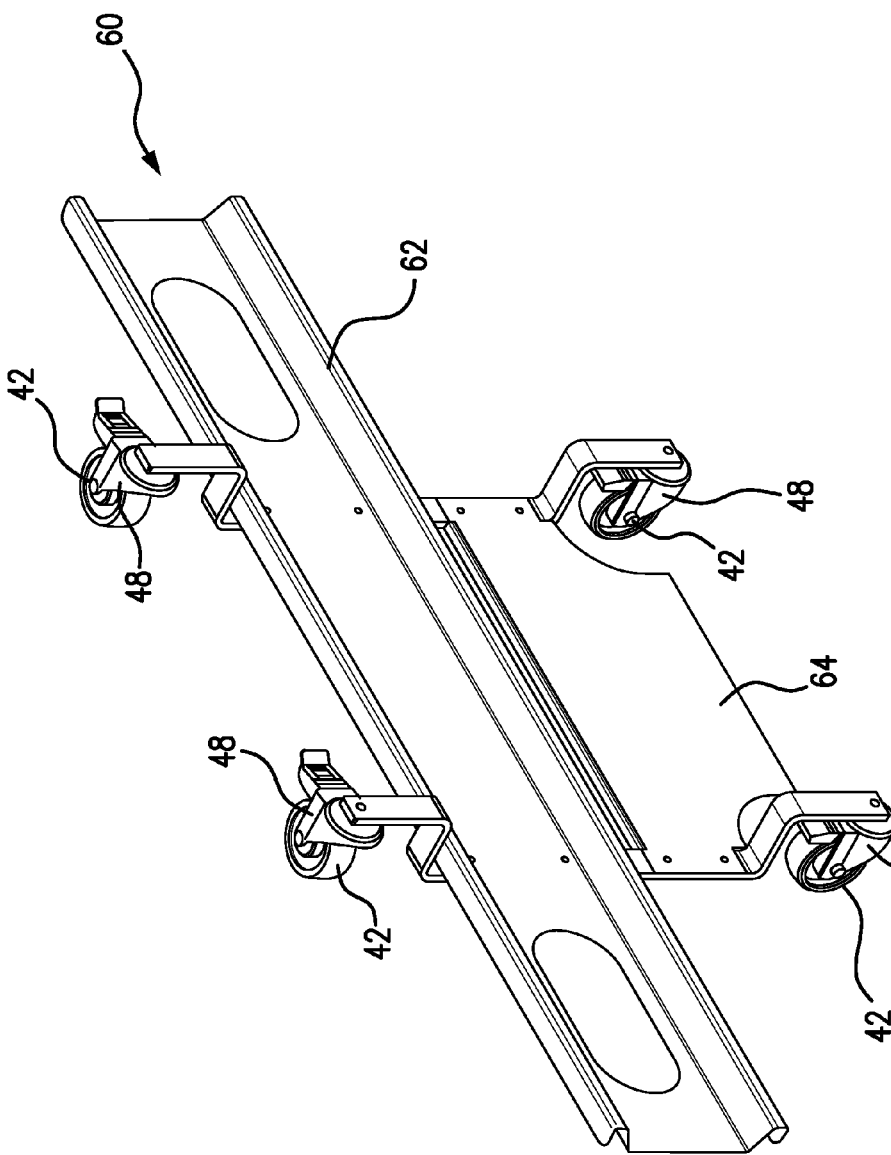
FIG. 9 is a perspective view of an alternative embodiment of the present invention.

FIG. 9 is a depiction of an alternative embodiment 60. This embodiment is the same in all respects; however platform 62 is narrowed and specifically designed for a two wheeled vehicle. Platform 62 has cutouts to receive the vehicle wheels. A side platform 64 is included to accommodate a kickstand or other vehicle support.

Figure 10:
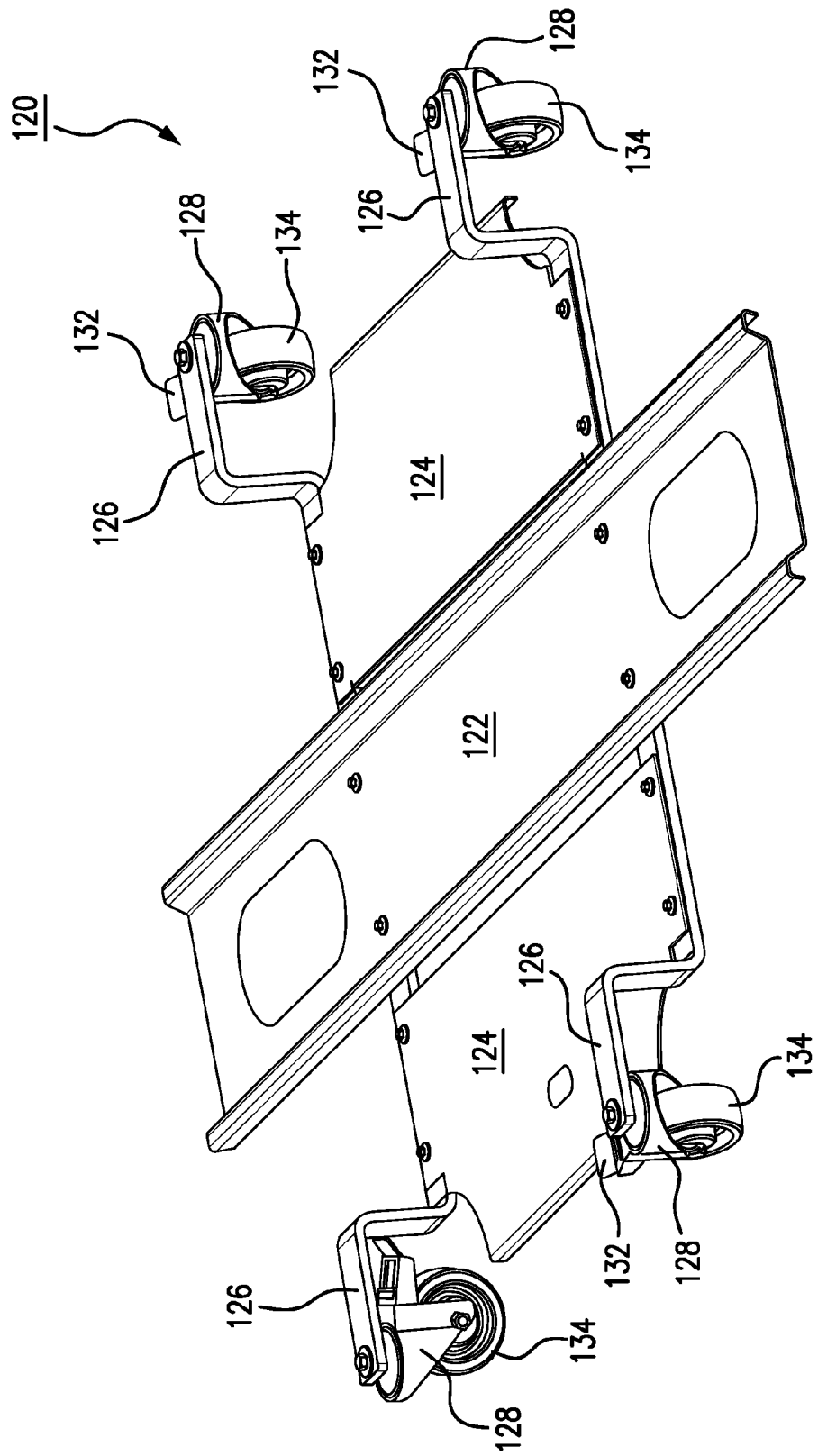
FIG. 10 is a perspective view of a further alternative embodiment of the present invention.

FIG. 10 is a depiction of a further embodiment 120 of the vehicle caddy. It is the same in most respect as the prior embodiments. However, in this embodiment, a central platform 122 is flanked by two opposing side platforms 124. This provides a greater degree of stability to the vehicle caddy. Each side platform 124 is supported by associated angled wheel supports 126. A fork 128 is rotatably secured to an end of each wheel support 126. Forks 126, in turn, support wheels 134. Wheels 134 can be prevented for rotational movement via locks 132.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A vehicle caddy system comprising:
    a multi wheeled vehicle;
    a rectangular platform for supporting the multi wheeled vehicle, the platform having upper and lower surfaces, a length and a width and first and second sides, the platform further including a forward and rearward end, and an intermediate extent therebetween, the platform having opposing upstanding edges that extend between the forward and rearward end;
    a first ramp positioned at the first end of the platform and a second ramp positioned at the second end of the platform, the ramps functioning to facilitate the movement of the vehicle over the forward and rearward ends of the platform;
    a first and a second axle, the first axle positioned at a distance from the forward end of the platform and the second axle position at a distance from the rearward end of the rectangular platform, wherein each distance is equal to one-third of the length of the rectangular platform, each axle being mounted at a position that is lower than the opposing upstanding edges of the platform, each axle having a width that is greater than the width of the rectangular platform;
    a series of four wheel supports, each wheel support having a vertical component and a horizontal component with a 90 degree angle therebetween, with two wheel supports being mounted to each axle, each wheel support being positioned above the upper surface of the platform, each wheel support including a swivel and fork, with the fork rotatably supporting a wheel, a lock associated with each wheel support to lock the associated swivel and selectively prevent its rotation;
    whereby the positioning of the axles allows the caddy to be pivoted about either the first or second axle depending upon whether the vehicle is being transferred over the first or second ramp.

2. The system as described in claim 1 wherein the vehicle is a three wheeled vehicle and the vehicle is positioned upon the platform.

3. The system as described in claim 1 wherein the platform includes a knurled surface to promote traction of the vehicle wheels.

* * * * *